United States Patent [19]

Ludman et al.

[11] 4,387,955
[45] Jun. 14, 1983

[54] HOLOGRAPHIC REFLECTIVE GRATING MULTIPLEXER/DEMULTIPLEXER

[75] Inventors: Jacques E. Ludman, Westford; Joseph L. Horner, Cambridge; Thomas L. Mikes, Harvard, all of Mass.

[73] Assignee: The United States of America as represented by the Secretary of the Air Force, Washington, D.C.

[21] Appl. No.: 231,074

[22] Filed: Feb. 3, 1981

[51] Int. Cl.³ ............................................. G02B 5/32
[52] U.S. Cl. .................................. 350/96.19; 350/3.7; 370/3
[58] Field of Search .................. 350/3.65, 3.7, 3.83, 350/96.16, 96.19, 96.20; 370/1, 3

[56] References Cited

U.S. PATENT DOCUMENTS

| | | | |
|---|---|---|---|
| 3,506,327 | 4/1970 | Leith et al. | 350/3.5 |
| 3,578,845 | 5/1971 | Brooks et al. | 350/162 R |
| 3,586,412 | 6/1971 | Leith | 350/3.5 |
| 3,633,035 | 1/1972 | Uchida | 250/199 |
| 3,909,134 | 9/1975 | Pieuchard et al. | 356/99 |
| 3,930,728 | 1/1976 | Pieuchard et al. | 356/99 |
| 4,054,356 | 10/1977 | Noguchi | 350/3.5 |
| 4,111,524 | 9/1978 | Tomlinson | 350/96.19 |
| 4,140,362 | 2/1979 | Tien | 350/3.72 |
| 4,153,330 | 5/1979 | Tomlinson | 350/96.19 X |
| 4,198,117 | 4/1980 | Kobayashi | 350/96.19 |
| 4,274,706 | 6/1981 | Tangonan | 350/96.19 |
| 4,359,259 | 11/1982 | Horner et al. | 350/3.7 |

FOREIGN PATENT DOCUMENTS

| | | | |
|---|---|---|---|
| 55-90984 | 7/1980 | Japan | 350/3.7 |
| 55-95907 | 7/1980 | Japan | 350/96.16 |

OTHER PUBLICATIONS

Bykovskii et al, "Use of Selfoc-Type Optical Fibers to Record Fourier Holograms", *Opt. Spectrosc.*, vol. 48, No. 1, Jan. 1980, pp. 86-87.

Watanabe et al., "Optical Demultiplexer Using Concave Grating in 0.7-0.9 μm Wavelength Region", *Elect. Lett.*, vol. 16, No. 3, Jan. 1980, pp. 106-108.

Nishihara, H. et al., "Holocoupler: A Novel Coupler for Optical Circuits," *IEEE Journal of Quantum Electronics*, Sep. 1975, pp. 794-793.

Aoyama, Koh-ichi et al, "Low-Loss Optical Dimultiplexer for WDM Systems in the 0.8-m Wavelength Region", *Applied Optics*, vol. 18, No. 16, Aug. 15, 1979, pp. 2834-2836.

Kogelnik, Herwig, "Coupled Wave Theory for Thick Hologram Gratings," *The Bell System Technical Journal*, vol. 48, No. 9, Nov. 1969, pp. 2909-2947.

Tomlinson, W. J., "Wavelength Multiplexing in Multimode Optical Fibers," *Applied Optics*, vol. 16, No. 8, Aug. 1977, pp. 2180-2194.

Latta, M. R., "Design Techniques for Forming 488-nm Holographic Lenses With Reconstruction at 633 nm," *Applied Optics*, vol. 18, No. 14, Jul. 15, 1979, pp. 2413-2421.

*Primary Examiner*—John D. Lee
*Attorney, Agent, or Firm*—Donald J. Singer; Jacob N. Erlich

[57] ABSTRACT

A multiplexer/demultiplexer having a holographically formed reflective grating incorporated therein. In operation as a demultiplexer a single signal having a plurality of wavelengths impinges upon the holographic reflective grating in an appropriate manner and is separated into a plurality of signals, each being of a different one of the wavelengths. In the multiplexing mode of operation, a plurality of signals, each being of a different wavelength impinges upon the holographic reflective grating in an appropriate manner and emerges therefrom as a single signal having all of the different wavelengths.

8 Claims, 4 Drawing Figures

HOLOGRAPHIC REFLECTIVE GRATING MULTIPLEXER/DEMULTIPLEXER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a multiplexing system, and, more particularly, to a multiplexer/demultiplexer which incorporates therein a holographically formed reflective grating.

The need frequently arises for communications or reconnaissance systems which simultaneously convey multiple messages from a large number of information sources in one location to a large number of users at another location. Multiplexing systems economically meet this need by combining the messages from several information sources, which are then transmitted as a composite group over a single transmission facility, with provision at the receiver for separation (demultiplexing) back to the individual messages. Since only one transmission facility is needed instead of many, one advantage of multichannel operation is a lessening of the total quantity of necessary equipment. Each of the individual streams of information that form a multiplexed group are often denoted as a channel.

There are generally two generic forms of multiplexing systems. These are wavelength or frequency division multiplexing and time division multiplexing. Frequency division multiplexing is directly applicable to continuous wave form (analog) sources, in essence involving stacking side by side in frequency several information channels so as to form a composite signal. The composite frequency-multiplexed signal is then used to modulate a carrier in some conventional manner. Recovery of the individual messages after reception and demodulation is accomplished by bandpass filtering and frequency selection of the channels.

Time division multiplexing is a logical extension of pulse modulation and involves interleaving in time the narrow pulses of several ordinary pulse modulation signals and thus form one composite pulse transmission system. Separation of the time multiplexed pulse streams at the receiver is accomplished by gating appropriate pulses into individual channel filters.

A third technique, phase multiplexing, is possible but appears less practical than either frequency division multiplexing or time division multiplexing.

In recent years with the development and implementation of fiber optic technology into practical transmission systems a great deal of attention has been given to the multiple carrier technique referred to as wavelength division multiplexing (WDM). This technique, which is the optical equivalent of frequency division multiplexing techniques employed in RF coaxial transmission networks, can be used to increase the information transfer capacity of the medium. In the wavelength division multiplexing technique each discrete data channel is modulated onto an optical carrier of a fixed wavelength. Each of the individual carriers are then superimposed onto the optical transmission medium. At the optical receiver the individual carriers must be reestablished by separating the composite carrier into its individual wavelength components.

One of the parameters that encourages the development of wavelength division multiplexing is the inherent narrow spectral characteristics of optical sources and the relatively wide spectral bandwidth of an optical fiber. To achieve the desired optical separation and make wavelength division multiplexing practical, a series of optical techniques have been examined. Some of these techniques employ prisms, blazed plane reflection gratings, simple thick reflection gratings, multiple thick reflection gratings, simple thick transmission gratings and dichromatic coatings.

Unfortunately, size and expense are critical factors when providing optical multiplexing systems. To date, however, multiplexing systems have been either unreliable in complete separation of the individual wavelength components or are of such size and cost so as to provide an overall system which is incompatible with the desired small size and economic requirements. Consequently, a need arises for a small, lightweight, inexpensive device which can be effectively used as both a multiplexer and demultiplexer and yet be compatible with the inherent narrow spectral characteristics of today's optical sources.

SUMMARY OF THE INVENTION

The instant invention overcomes the problems encountered in the past by providing a multiplexer/demultiplexer made up of a single component in the form of a holographically formed reflective grating and is therefore small, lightweight, and inexpensive to produce. In addition, the reflective grating multiplexer/demultiplexer of this invention can be made to operate directly with the diverging output of an optical fiber, performing the functions of collimating, wavelength separation and refocusing in a single element. Furthermore, because the multiplexer/demultiplexer of this invention incorporates an essentially two dimensional (curved) reflective grating therein it is easily fabricated at one wavelength and operable at another wavelength.

The multiplexer/demultiplexer of this invention incorporates therein a grating operating in reflection. This reflective grating is made by a holographic technique utilizing a spherically curved photosensitive medium so as to achieve a high diffraction efficiency as well as a broad bandwidth of operation. The photosensitive medium must be capable of high resolution in order to record the high density of optical fringes necessary for practical operation.

A high efficiency holographic reflective grating can be produced if care is taken in selecting the groove density. That is, if the grating operates in a wavelength region such that the ratio of wavelength to groove period ($\lambda/d$) is between 0.8 and 1.5, a sinusoidal groove profile (such as that produced by holographic methods) can achieve high efficiency. Unpolarized diffraction efficiency in excess of 74% has been achieved and polarized efficiency in excess of 95% has been obtained for the proper polarization.

In fabricating the reflective holographic grating multiplexer/demultiplexer of this invention a pair of temporally and spatially coherent beams of electromagnetic radiation are made to interfere in a photosensitive medium. Preferably both beams are derived from the same source of electromagnetic radiation and form two separate paths of substantially identical length. The first beam, after being focused to a point located in front of the photosensitive medium, becomes divergent before impinging upon the photosensitive medium. The second beam emerges from an optical fiber or the like acting as a point source and is also divergent before impinging upon the same side of the photosensitive medium as the focal point of the first beam referred to hereinabove. Thereafter, the photosensitive medium is developed by methods appropriate to the photosensitive medium in order to produce the holographic reflective grating utilized in the multiplexer/demultiplexer of this invention.

In use as a demultiplexer an electromagnetic signal or beam containing a plurality of channels of slightly differing wavelengths is introduced into the holographic reflective grating from an optical fiber having the same relative position with respect to the holographic reflective grating as the optical fiber had to the photosensitive medium during the production of the reflective grating. Within the holographic reflective grating of the multiplexer/demultiplexer of this invention, the individual channels or wavelengths are angularly separated, and directed each to a position located substantially along a line having the same relative position to the holographic reflective grating as a line drawn through the focal points of the two beams utilized to make the holographic grating. The spatially separated channels or wavelengths can be detected at these positions by a plurality of conventional detectors or can be received directly by a series of optical fibers. When this invention operates as a multiplexer, the holographic reflective grating is utilized in a reverse procedure in which the device combines a plurality of optical channels or wavelengths into a single beam having all the channels or wavelengths.

It is therefore an object of this invention to provide a multiplexer/demultiplexer which is small, lightweight and extremely efficient in operation.

It is another object of this invention to provide a multiplexer/demultiplexer which has incorporated therein a holographically formed reflective grating.

It is a further object of this invention to provide a holographic reflective grating multiplexer/demultiplexer which is capable of operating with the diverging output of an optical fiber.

It is still a further object of this invention to provide a holographic reflective grating multiplexer/demultiplexer which is easily fabricated at one wavelength and yet capable of operating at another wavelength.

It is still another object of this invention to provide a holographic reflective grating multiplexer/demultiplexer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawings and its scope will be pointed out in the appended claims.

DETAILED DESCRIPTION OF THE DRAWING

DETAILED DESCRIPTION OF THE PREFERRED EMBODIMENT

In order to fully understand this invention, it is first necessary to describe acceptable techniques for producing the holographic reflective grating A of the multiplexer/demultiplexer 10 of this invention.

Figure 1:
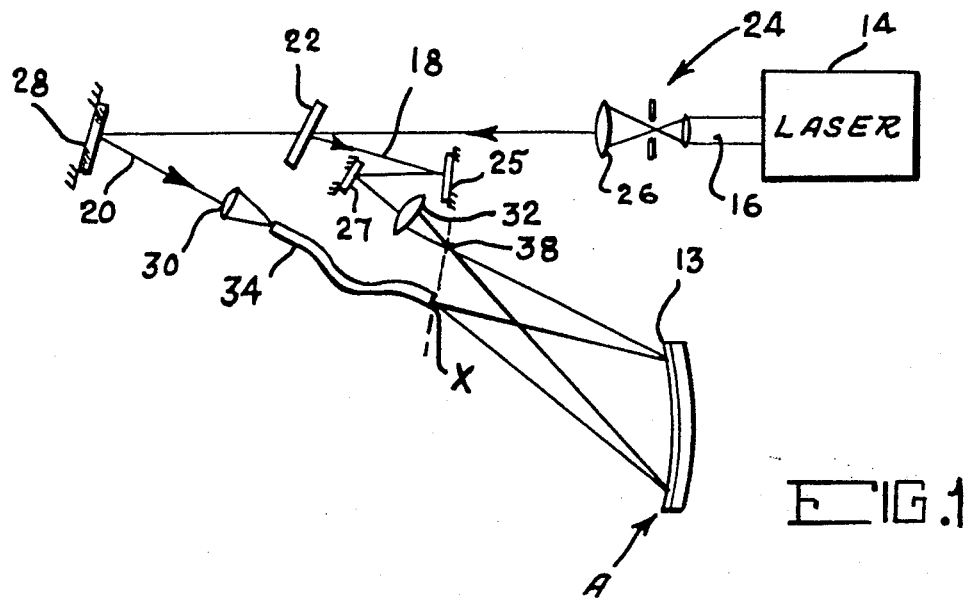
FIG. 1 is a schematic representation of a technique for producing the holographic reflective grating utilized in the multiplexer/demultiplexer of this invention.

Reference is now made to FIG. 1 of the drawing in order to fully describe one of the techniques which may be utilized to produce the reflective grating A of the multiplexer/demultiplexer 10 of this invention. This procedure incorporates therein the utilization of a photosensitive medium 13 described more fully in detail hereinbelow and any conventional source of temporally and spatially coherent, monochromatic electromagnetic radiation 14. The source of electromagnetic radiation may be in the form of, for example, an argon laser.

Laser 14 produces a beam 16 of electromagnetic radiation. Beam 16 is divided into two portions of paths, hereinafter referred to as beams 18 and 20, by any suitable beam dividing means such as a conventional beam splitter 22. Spatial filtering of beam 16 may be accomplished by any conventional spacial filtering device, such as a lens-pinhole filter 24 while collimation of beam 16 may be achieved by any conventional collimating device such as lens 26. Additionally, in the method of fabricating multiplexer/demultiplexer 10 as illustrated in FIG. 1 of the drawing, the path lengths of beams 18 and 20 are made substantially equal to provide an interference between beams 18 and 20 within photosensitive medium 13. By so doing, the reflective grating A of the multiplexer/demultiplexer 10 of this invention, after subsequent development, is produced.

Still referring to FIG. 1 of the drawing, photosensitive medium 13 can be in the form of, for example, a photo resist film. In addition, it is preferred that photosensitive medium 13 be spherically curved in order to afford an additional degree of freedom in the fabrication procedure thus making it relatively easy to produce a device which yields high efficiency and low aberration. Furthermore, it would be desirable to utilize the Littrow configuration in which the input and output beams are nearly co-located and at such an angle that one first order diffraction is the demultiplexed beam and the other first order does not exist. The substantially identical path lengths of beams 18 and 20 are achieved by the appropriate placing of any suitable directing element such as mirrors 25 and 27 within the path of beam 18, and mirror 28, a focusing device such as lens 30 and a conventional optical fiber 34 of appropriate length within the path of beam 20.

Beam 20 emerges from the end, X, of fiber 34 which acts as a point source. As a divergent beam, beam 20 illuminates the photosensitive medium 13 which is selected to have a high sensitivity at the wavelength of the coherent source of radiation 14. The other beam 18 passes through a conventional converging device such as lens 32 which focuses beam 18 to a focal point 38 located in front of or more specifically on the same side of photosensitive medium 13 upon which beam 20 impinges.

The two beams 18 and 20 meet and interfere in photosensitive medium 13, which, after appropriate development, bleaching or other processing, records the resultant fringe pattern. The ratio of the two beam intensities would preferably be unity at the center of the pattern, although it varies by a factor of typically two across the interference region due to the oblique angle between fiber 34 and photosensitive medium 13. The use of identical path lengths for beams 18 and 20 insures both a high coherence between the two beams and a high modulation of the interference fringes.

Photosensitive medium 13 is exposed by beams 18 and 20. Generally, diffraction efficiency is measured by dividing light intensity in focused spot 38 by the light intensity emerging at point X. The exposure time may be adjusted to give the maximum possible diffraction efficiency. Subsequent development of photosensitive medium 13 produces reflective grating A as illustrated more clearly in FIG. 3 of the drawing.

After the photosensitive medium 13, typically a photo-resist material, is exposed, it is developed by appropriate means, resulting in a relief type groove pattern more fully described hereinbelow with respect to FIG. 4 of the drawing. In order to make the pattern reflective, it may be coated by a metallic material, such as aluminum, deposited on its surface. The fabrication is now completed, and reflective grating A may be deployed within multiplexer/demultiplexer 10 as set forth below.

Figure 2:
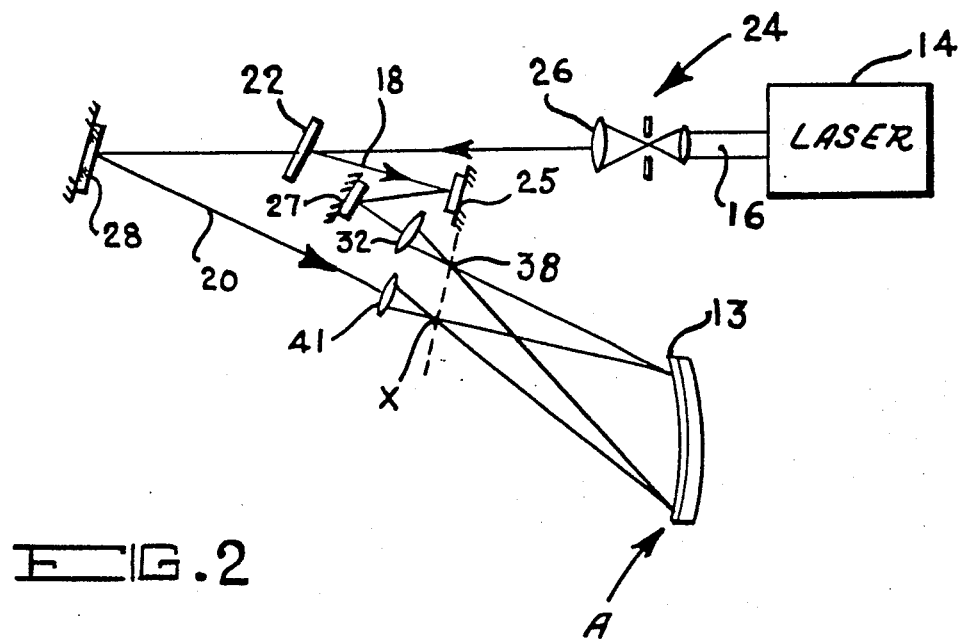
FIG. 2 is a schematic representation of another technique for producing the holographic reflective grating utilized with the multiplexer/demultiplexer of this invention.

Before setting forth the actual operation of holographic reflective grating multiplexer/demultiplexer 10 of this invention, an alternate procedure for producing reflective grating A is described hereinbelow. This procedure is best shown in FIG. 2 of the drawing. The procedure depicted in FIG. 2 is identical to the procedure set forth hereinabove with respect to FIG. 1 except that the optical fiber 34 is replaced with an air path and an appropriate focusing device in the form of lens 41. Therefore, for purposes of clarity of understanding of this invention, identical reference numerals will be used to designate similar elements in both FIGS. 1 and 2 of the drawing. Lens 41 is arranged to focus the beam 20 at the same point in space, X, previously occupied by the end, X, of the optical fiber 34 shown in FIG. 1 of the drawing. In so doing, such a procedure enables point source X to simulate the output of a perfect optical fiber. Such a procedure is extremely desirable since if fiber 34, shown in FIG. 1 of the drawing, is one of the multimode types of fibers, the radiation emerging from fiber 34 is a speckle pattern with variations in amplitude and phase throughout the output pattern. Consequently, there are regions within photosensitive medium 13 in which no interference pattern is recorded. Such an effect detracts from the overall efficiency of the multiplexer/demultiplexer 10 of this invention since the output pattern changes from fiber to fiber, or, in some instances even within the same fiber if the fiber is flexed or bent.

The procedure set forth above and illustrated in FIG. 2 of the drawing obviates this problem and insures that an interference pattern is recorded over the full extent of the overlapping beams 18 and 20. Such a technique, as illustrated in FIG. 2 and more fully described in U.S. Patent Application Ser. No. 201,860 filed Oct. 29, 1980 greatly improves the overall efficiency of this invention.

Figure 3:
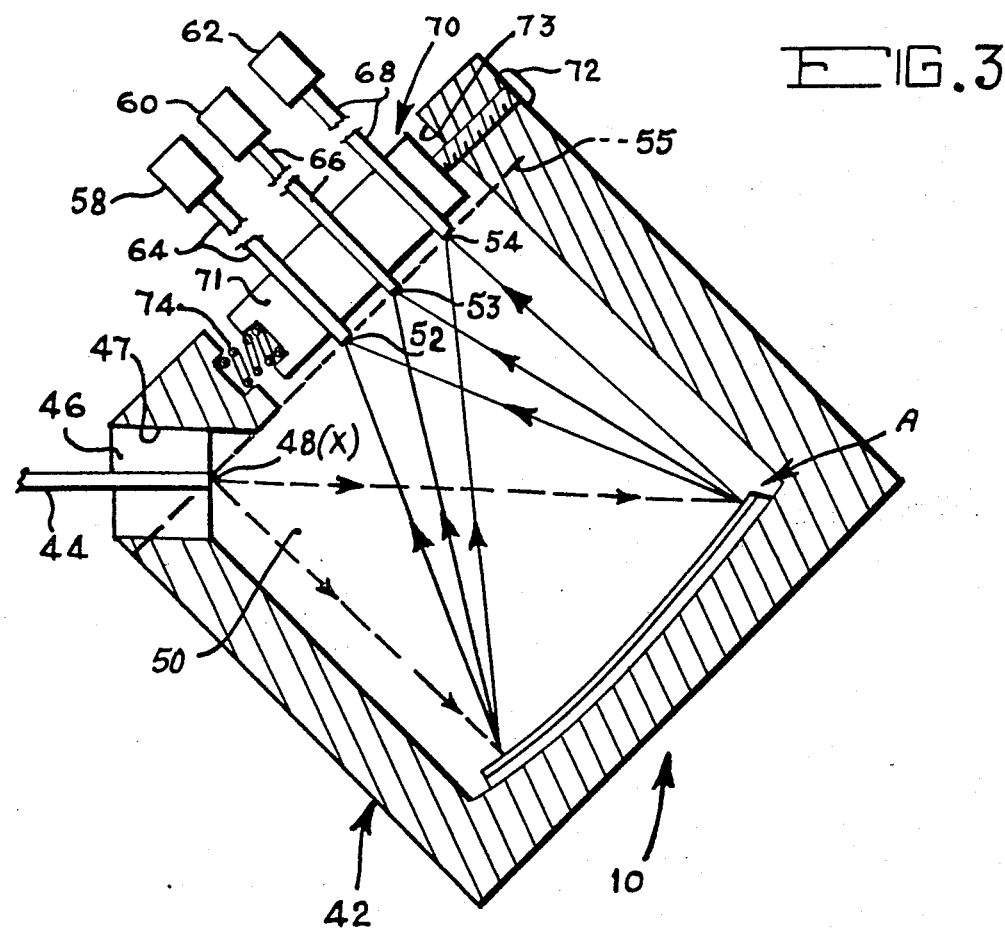
FIG. 3 is a schematic plan view of the holographic reflective grating multiplexer/demultiplexer of this invention, shown partly in cross-section.

Reference is now made to FIG. 3 of the drawing which clearly illustrates the holographic reflective grating multiplexer/demultiplexer 10 of this invention as well as illustrating schematically its mode of operation. Multiplexer/demultiplexer 10 of this invention is made up of a housing or fixture 42 which fixedly mounts therein the holographically formed reflective grating A. Reflective grating A has been fabricated by either the method described with respect to FIG. 1 or with respect to FIG. 2 of the drawing. In utilizing reflective grating A as a demultiplexer, for example, an optical fiber 44 is positioned within a mounting block 46 secured within an opening 47 situated in housing 42. The end 48 of fiber 44 is located substantially at the same spot, X, relative to holographic reflective grating A as the relationship between point, X, and photosensitive medium 13 utilized in the preparation of grating A and as depicted in FIGS. 1 and 2 of the drawing.

Still referring to FIG. 3, fiber 44 is coupled to a beam of electromagnetic radiation (not shown) having a plurality of wavelengths or wavelength division multiplexed signals. These signals in the form of beam 50 emerge from fiber 44. As a result of the holographic makeup of reflective grating A each of the different wavelength channels is focused to a different spot, illustrated by three such positions 52, 53 and 54 in FIG. 3. Positions 52, 53 and 54 are situated substantially along a line (illustrated by dotted line 55) having the same relative position with respect to holographic reflective grating A as a line drawn through focal point 38 of beam 18 and point X has with respect to photosensitive medium 13 described with reference to the making of reflective grating A.

Therefore, in order to produce an operable multiplexer/demultiplexer 10 a plurality of detectors 58, 60 and 62 are operably connected by means of for example, a plurality of optical fibers 64, 66 and 68, respectively, to points 52, 53 and 54. This is accomplished by mounting fibers 64, 66 and 68 in an adjustable assembly 70 made up of a mounting block 71 situated within an opening 73 in housing 42. Any suitable adjustable arrangement in the form of set screw 72 and spring 74, for example, may be utilized to adjust the position of block 71 and therefore fibers 64, 66 and 68 to coincide with points 52, 53 and 54, respectively. It should, however, be realized that any other arrangement for adjustably aligning fiber 44, holographic reflective grating A and fibers 64, 66 and 68 can also be used within the scope of this invention.

More specifically, within the operation of multiplexer/demultiplexer 10 of this invention each channel is separated and focused by reflective grating A to a separate position or point (52, 53, 54, for example) along line 55. The longer wavelength channels, due to their greater diffraction, focus to a point 54 further from the input point 48 (X) than, for example, the shorter wavelength channel 52. The focused spots or positions 52, 53 and 54 of electromagnetic radiation of each channel can be directly coupled to an individual optical fiber 64, 66 and 68, respectively, or to detectors 58, 60 and 62, depending upon the application of this invention.

It should also be noted that although only three such points 52, 53 and 54 representative of three wavelengths are illustrated in the drawing, this invention is not limited to this particular member which is only used for purposes of illustration. In addition, the alignment of the input fiber 44 is only critical in that it must be within a few millimeters of spot X. It is also unnecessary to have a strictly coherent optical signal for efficient operation. Hence, power sources with limited coherence lengths such as laser diodes or light emitting diodes can be utilized as the source of electromagnetic radiation for the multiplexer/demultiplexer 10 of this invention.

Although FIG. 3 of the drawing is utilized to illustrate the demultiplexing operation of this invention, it can also be utilized to depict the multiplexing operation of this invention in which all beams would be propagating in the reverse direction. That is, the individual optical channels or wavelengths would emerge from fibers 64, 66 and 68, reflected from holographic reflecting grating A and enter fiber 44 or a conventional detector (not shown) as a multiplexed signal. However, whether this device is used as a multiplexer or demultiplexer, either method (illustrated in FIGS. 1 or 2) of preparing reflective grating A can be utilized within the scope of this invention.

Figure 4:
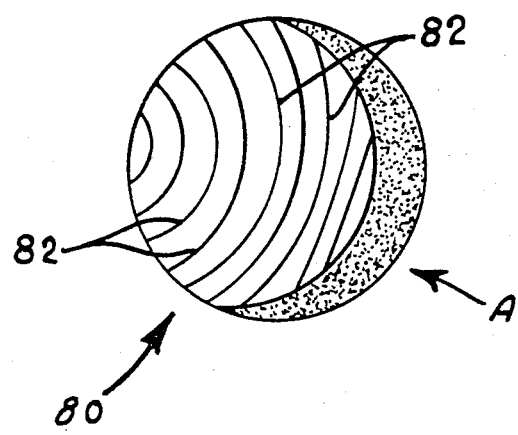
FIG. 4 is a schematic representation of the groove profile on the holographic reflective grating of the multiplexer/demultiplexer of this invention.

FIG. 4 illustrates the groove shape 80 of the reflective grating A, produced by the techniques described in FIGS. 1 and 2. The curves 82 are conic sections of varying curvature. The past techniques of ruling linear gratings by purely mechanical means on glass or metal substrates render linear gratings which do not possess any focusing power. A collimated beam of light incident on such a grating exits the grating as a collimated beam of light. The variable curvature of the grooves of the holographically formed reflective grating A described as part of this invention herein renders the output beam convergent, focusing to a point compatible with launching into another optical fiber. Furthermore, high efficiency holographic reflective gratings can be produced if care is taken in selecting groove density. In other words, high efficiency can be achieved with a ratio of wavelength to groove period ($\lambda/d$) between 0.08 and 1.5, with the sinusoidal groove profile achievable by holographic techniques.

Although this invention has been described with reference to particular embodiments, it will be understood to those skilled in the art that this invention is also capable of a variety of further embodiments within the spirit and scope of the appended claims. For example, ideally, the wavelength in which the multiplexer/demultiplexer 10 of this invention is fabricated, would be the center of the band at which the device would be used. Situations could arise, however, where this would not always be possible. It would then be relatively easy to fabricate this invention at one wavelength for use at a different wavelength using known optical design equations.

We claim:

1. A multiplexer/demultiplexer comprising:
   a holographically formed, spherically curved reflective grating, said holographically formed grating being configured to diffract only one first order beam;
   means located substantially at a first preselected point adjacent said holographically formed reflective grating for directing into or receiving from said holographically formed reflective grating a single beam of electromagnetic radiation having a plurality of different wavelengths; and
   means located at a plurality of positions substantially along a line extending through said first preselected point and a second preselected point adjacent said holographically formed reflective grating for receiving from or directing into said holographically formed reflective grating a plurality of beams of electromagnetic radiation, each of said beams being at a different wavelength.

2. A multiplexer/demultiplexer as defined in claim 1 wherein said holographically formed reflective grating operates in a wavelength region such that the following relationship is met: $\lambda/d = 0.8$ through 1.5 and wherein $\lambda$ defines said wavelength region and d defines the groove period of said holographically formed reflective grating.

3. A multiplexer/demultiplexer as defined in claim 1 wherein the relationship between said holographically formed reflective grating, said first preselected point and said second preselected point is substantially the same as the relationship between a photosensitive medium, a point source of a first diverging beam of temporally and spatially coherent electromagnetic radiation impinging upon said photosensitive medium and the focus point source of a second diverging beam of temporally and spatially coherent electromagnetic radiation impinging upon said photosensitive medium during the making of said reflective grating from said photosensitive medium.

4. A multiplexer/demultiplexer as defined in claim 3 wherein said first preselected point and said second preselected point are located adjacent the same side of said holographically formed reflective grating.

5. A multiplexer/demultiplexer as defined in claim 4 wherein said holographically formed reflective grating operates in a wavelength region such that the following relationship is met: $\lambda/d = 0.8$ through 1.5 and wherein $\lambda$ defines said wavelength region and d defines the groove period of said holographically formed reflective grating.

6. A multiplexer/demultiplexer as defined in claim 5 further comprising a housing, said housing having a first and a second opening therein, said means for directing into or receiving from said holographically formed reflective grating said single beam of electromagnetic radiation being situated within said first opening, said plurality of means for receiving from or directing into said holographically formed reflective grating said plurality of beams of electromagnetic radiation being situated within said second opening, and said holographically formed reflective grating being secured within said housing in optical alignment with said means for directing into or receiving from said holographically formed reflective grating a single beam of electromagnetic radiation and said plurality of means for receiving from or directing into said holographically formed grating a plurality of beams of electromagnetic radiation.

7. A multiplexer/demultiplexer as defined in claim 6 wherein said plurality of means for receiving from or directing into said holographically formed reflective grating said plurality of beams of electromagnetic radiation comprises a plurality of optical fibers.

8. A multiplexer/demultiplexer as defined in claim 7 wherein said means situated within said second opening for receiving from or directing into said holographically formed reflective grating a plurality of beams of electromagnetic radiation is adjustably mounted within said second opening.

* * * * *